United States Patent [19]
Buckley et al.

[11] Patent Number: 5,919,387
[45] Date of Patent: Jul. 6, 1999

[54] INDUCTIVE SYSTEMS FOR BONDING AND JOINING PIPES

[75] Inventors: John D. Buckley, Newport News; Robert L. Fox, Hayes; Samuel D. Johnson, Yorktown; Carl E. Copeland, Yorktown; Robert H. Coultrip, Yorktown, all of Va.

[73] Assignee: The United States of America as represented by the United States National Aeronautics and Space Administration, Washington, D.C.

[21] Appl. No.: 08/840,110

[22] Filed: Apr. 3, 1997

Related U.S. Application Data

[60] Provisional application No. 60/015,968, Apr. 3, 1996.

[51] Int. Cl.⁶ ........................................... H05B 6/10
[52] U.S. Cl. .................. 219/633; 219/634; 219/611; 156/274.2; 156/380.2
[58] Field of Search ................... 219/633, 634, 219/607, 611; 156/272.2, 272.4, 274.2, 380.2; 285/288.1, 288.11

[56] References Cited

U.S. PATENT DOCUMENTS

| | | |
|---|---|---|
| 4,234,781 | 11/1980 | Flink . |
| 4,521,659 | 6/1985 | Buckley et al. . |
| 5,240,542 | 8/1993 | Milller et al. . |
| 5,266,764 | 11/1993 | Fox et al. . |
| 5,340,428 | 8/1994 | Kodokian . |
| 5,350,902 | 9/1994 | Fox et al. . |
| 5,374,808 | 12/1994 | Coultrip et al. . |
| 5,374,809 | 12/1994 | Fox et al. . |

*Primary Examiner*—Philip H. Leung
*Attorney, Agent, or Firm*—Kimberly A. Chasteen

[57] ABSTRACT

A method for bonding or joining plastic or metallic pipe using induced energy is provided. A susceptor is placed between the two pipes to be joined and a magnetic flux is induced onto the susceptor. The second pipe may be a coupling device. The magnetic flux may be induced by a tank circuit or an induction heating gun. The induction heating gun may be formed with a hinged heating head. The susceptor may be a perforated metal ring or a wire coil. The susceptor is coated with a material compatible with the pipes, for example, a plastic adhesive material, magnetic flux is an induction heating gun having a hinged heating head.

9 Claims, 8 Drawing Sheets

INDUCTIVE SYSTEMS FOR BONDING AND JOINING PIPES

CLAIM OF BENEFIT OF PROVISIONAL APPLICATION

Pursuant to 35 U.S.C. §119, the benefit of priority from provisional application 60/015,968, with a filing date of Apr. 3, 1996, is claimed for this non-provisional application.

ORIGIN OF THE INVENTION

The invention described herein was jointly made by employees of the U.S. Government and employees of the Inductron Corporation and may be manufactured and used by or for the Government for governmental purposes without the payment of any royalties thereon or therefor.

BACKGROUND OF THE INVENTION

1. Technical Field of the Invention

The present invention relates generally to induction bonding or joining, and more particularly to bonding or joining plastic or metallic pipe using induced energy.

2. Discussion of the Related Art

There currently exists a wide number and variety of induction heating devices. One such induction heating device is described in U.S. Pat. No. 4,521,659, issued to Buckley et al. on Jun. 4, 1985. The heating gun described therein uses a tank circuit which includes a capacitor and an inductor coil. The inductor coil is wrapped around a U-shaped pole piece which has a gap formed between the ends thereof. The capacitor of the tank circuit is connected to a power supply which provides an alternating current of predetermined frequency.

The aforementioned patent describes a technique of joining two sheets of material by placing a susceptor, such as a wire screen, between the sheets with adhesive therebetween. The heating gun is positioned above the two sheets and the screen with the ends of the pole piece touching one of the sheets and with a gap of the pole piece located above the area where the sheets are to be joined. An alternating current from the power source enters the tank circuit and the capacitor increases the Q of the tank circuit, in turn increasing the current flow through the inductor coil. Direction of the current along the inductor coil reverses at each cycle of alternating current. The current flow in the inductor coil creates a magnetic flux within the turns of the coil. The flux is picked up by the pole piece and carried to either of the two ends. The flux then jumps to the susceptor rather than across the gap to the other of the two ends. Since the sheets of material are transparent to magnetic flux, the flux is easily transferred to the screen through the sheets. The rapidly changing direction of current in the coil causes the flux to change constantly in magnitude and direction. This is also true in the metal screen as well as in the pole piece. Hysteresis creates eddy currents in the screen which result in heat being generated in the screen.

While the aforementioned heating gun is suitable for laying down a single heat zone, whereby a seam can be created between two pieces of layered material, it is sometimes desirable to join two pieces of ceramic, metallic or plastic pipe or tubing. Previously disclosed induction bonding methods do not provide a method for bonding pipe or tubing.

Previously known methods of joining pipe or tubing include open flame, forced hot air, chemical heat, and resistive heater devices. All of these techniques and devices suffer from one or more disadvantages, most significantly that of the potential for explosion when working around hazardous, inflammable fuels. Moreover, the aforementioned devices and techniques are difficult for a technician or a mechanic to handle with one hand, and are generally not capable of efficiently and effectively producing a uniform heat zone circumferentially around a cylindrical shrink fit coupling.

It is accordingly an object of the present invention to provide an apparatus for joining plastic or metallic pipes.

It is another object of the present invention to provide an apparatus for joining plastic or metallic pipes using induced energy.

It is another object of the present invention to provide an apparatus for joining plastic or metallic pipes which is more environmentally safe than previous methods.

It is yet another object of the present invention to accomplish the foregoing objects in a simple manner.

Additional objects and advantages of the present invention are apparent from the drawings and specification which follow.

SUMMARY OF THE INVENTION

According to the present invention, the foregoing and additional objects are obtained by providing an apparatus for bonding pipes which bonds a first pipe to a second pipe. A susceptor is placed between the two pipes and a magnetic flux is induced onto the susceptor. The second pipe may be a coupling device. The magnetic flux may be induced by a tank circuit or an induction heating gun. The induction heating gun may be formed with a hinged heating head. The susceptor may be a perforated metal ring or a wire coil. The susceptor is coated with a material compatible with the pipes, for example, a plastic adhesive material.

DETAILED DESCRIPTION OF THE PREFERRED EMBODIMENT

Figure 1:
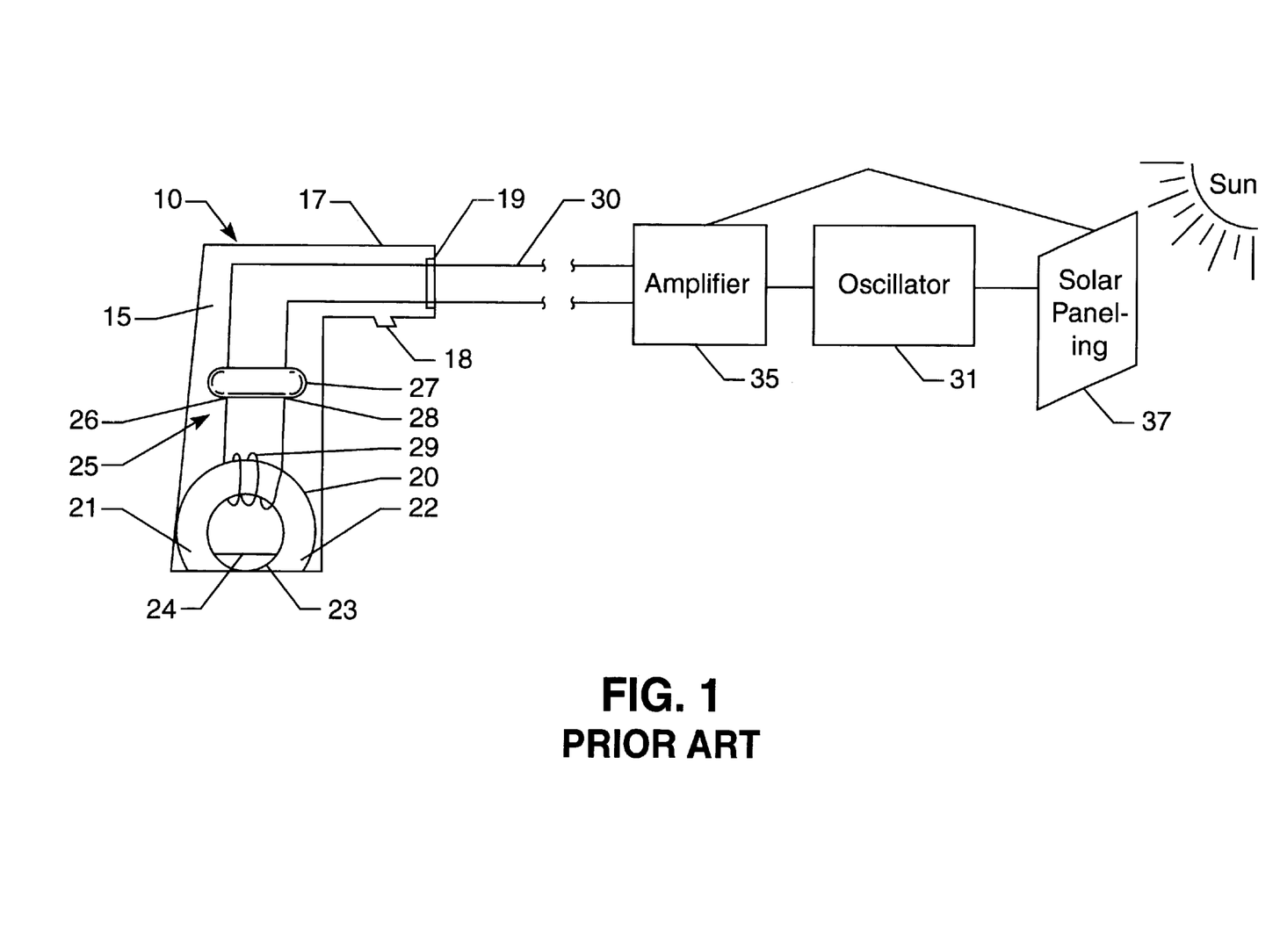
FIG. 1 is a cross-sectional view of an induction heating gun.

Referring now to FIG. 1, an induction heating gun used in accordance with this invention is represented generally by the reference numeral 10. The heating gun 10 is contained in a housing 15, and comprises a ferrite flexible head 20, a tank circuit designated generally by the reference numeral 25, and an input of electrical energy designated generally by the reference numeral 30.

The ferrite flexible head 20 is constructed of an inductive material, e.g., powdered iron or an alloyed ferrite generally cylindrical in shape, it is curved such that its ends 21 and 22 approach each other but leave a gap 23 between themselves. The length of the gap 23 is less than the maximum thickness of the ferrite flexible head 20 and may be varied, as may be the composition and size of the ferrite flexible head 20, according to results desired. In the preferred embodiment of the invention, the ferrite flexible head 20 is constructed from a toroid of powdered iron. A segment is removed from the toroid, leaving a gap 23 sufficient in length to allow heating of the materials to be joined. A filler piece 24 may be fitted into the gap 23. Such a filler piece 24 is made of a fluorocarbon polymer sold under the tradename of Teflon by the DuPont Company, or a similar material.

The tank circuit 25 includes a capacitor 27 and an inductor coil 29 having ends 26 and 28. The inductor coil 29 may be of 10-gauge copper wire or other conductive material. The inductor coil 29 encircles the ferrite flexible head 20, such that it is in actual contact with the ferrite flexible head 20. The number of turns of the inductor coil 29 around the ferrite flexible head 20 varies with desired heating results, but excellent performance has been obtained with as few as three turns, and inductive heat has been produced by the magnetic flux generated by a single-turn inductor coil.

The ends 26 and 28 of the inductor coil 29 are connected to the capacitor 27. The capacitor 27 may be single, as depicted in FIG. 1, or several capacitors may be connected in parallel. In the preferred embodiment, the resultant tank circuit 25 has a reactance of about 70 ohms.

The capacitor 27 of the tank circuit 25 connects to the input of electrical energy 30. FIG. 1 shows a suggested arrangement of components which control the characteristics of the electrical input 30. In theory, any combination of elements providing 30 watts or more of power to the tank circuit 25 may be used. In the preferred embodiment of FIG. 1, an oscillator 31 and amplifier 35 regulate the frequency and current supplied to the tank circuit 25. The oscillator 31 converts a direct current to an alternating current of a chosen frequency; the amplifier 35 increases the strength of the electrical impulse given to the tank circuit 25.

The ultimate source of electrical energy may be any of those known in the art. In the embodiment of FIG. 1, solar energy is suggested. Twenty square feet of solar paneling 37 generally supplies the power necessary to bond thermoplastics using the apparatus and method of the present invention. The solar paneling 37 shown here is a source of direct current; an alternating current input is also usable.

The heating gun 10 may be housed in a portable container. The oscillator 31 and amplifier 35 may be miniaturized or transistorized and placed within the housing to make the entire system compact and portable. A suggested housing 15 is shown in FIG. 1, enclosing the heating gun 10. Made of plastic, it includes a handle 17, a power switch 18 and a power input receptacle 19. The handle 17 allows manual positioning and movement of the heating gun over an area of materials to be joined. The power switch 18, electrically connected to the input of electrical energy 30, controls supply of electrical current to tank circuit 25. The power input receptacle is one or more apertures designed to receive the current-carrying wires of the input of electrical energy 30.

For purposes of describing the preferred embodiment, joining of a 2 inch diameter plastic pipe will be described, although various sizes and types of pipe may be joined in the manner described.

Figure 2:
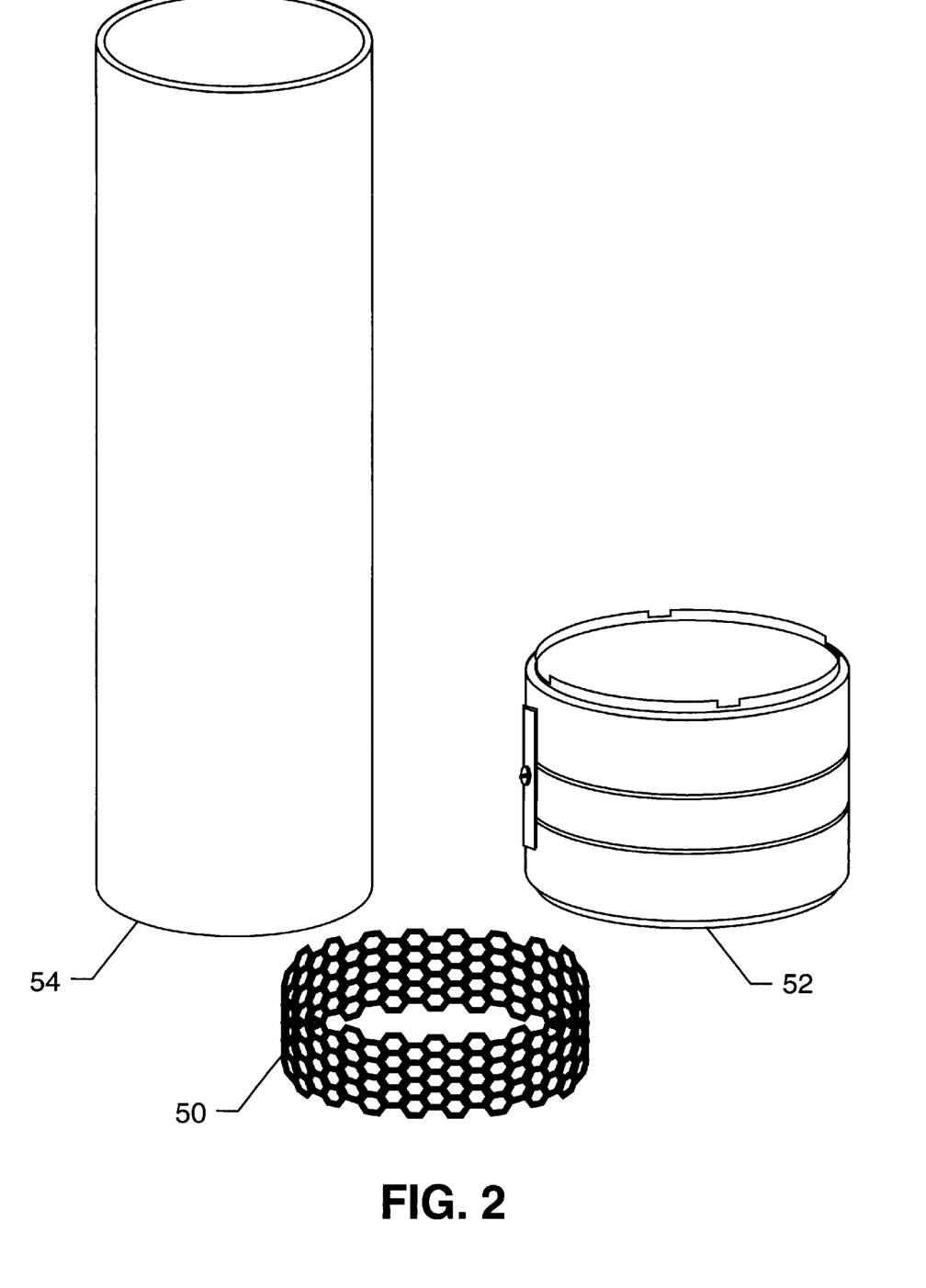
FIG. 2 is a perspective view of the component parts of the preferred embodiment.

As shown in FIG. 2, a 2 inch diameter, ½ inch wide ring susceptor 50 is formed using 1/16 inch thick perforated metal (for example, soft steel). The ring is then coated with a plastic adhesive material which is compatible with the type of pipe which is being joined. The coating fills all ring perforations and assures that no voids will exist in the pipe joints after bonding is accomplished. A coupling 52 is sized so that when the metal ring susceptor 50 is placed in the coupling 52 and the coupling 52 is positioned on a pipe 54, a tight interface exists between the ring susceptor 50 and the pipe 54 and between the ring susceptor 50 and the coupling 52. Using the induction heating gun 10, the ring susceptor 50 can be quickly heated to the melting temperature of the pipe/coupling/ring coating material resulting in a pressure tight coupling of the pipe 54 with no deformation of outer surfaces. To accomplish a reliable pressure tight bond, the ring susceptor 50 must be heated evenly to the bonding temperature of the pipe 54. The flexible head 20 must be configured so it can be removed from around two plastic pipes being coupled once bonding is accomplished. With the coupling 52, ring susceptor 50 and pipe 54 properly assembled, two methods of inductively heating the metal ring susceptor 50 are described below.

An alternate method for heating the ring susceptor 50 is described. Five turns of wire (preferably no. 10 wire) are wound around the coupling 52 so that the windings are equally spaced across the width of the ring susceptor 50. The ends of the coil leads are connected to a capacitor (not shown), thus forming a tank circuit coil (shown in FIGS. 3 and 4). When the tank circuit coil is energized, a magnetic flux is generated by the coil. The magnetic flux is conveyed to the metal ring susceptor 50. Resulting eddy currents are produced in the metal ring susceptor 50 causing the ring susceptor 50 to rapidly heat to the temperature required to produce pressure tight bonding between the pipe 54 and the coupling 52. The tank circuit coil can be removed and reused.

Figure 4:
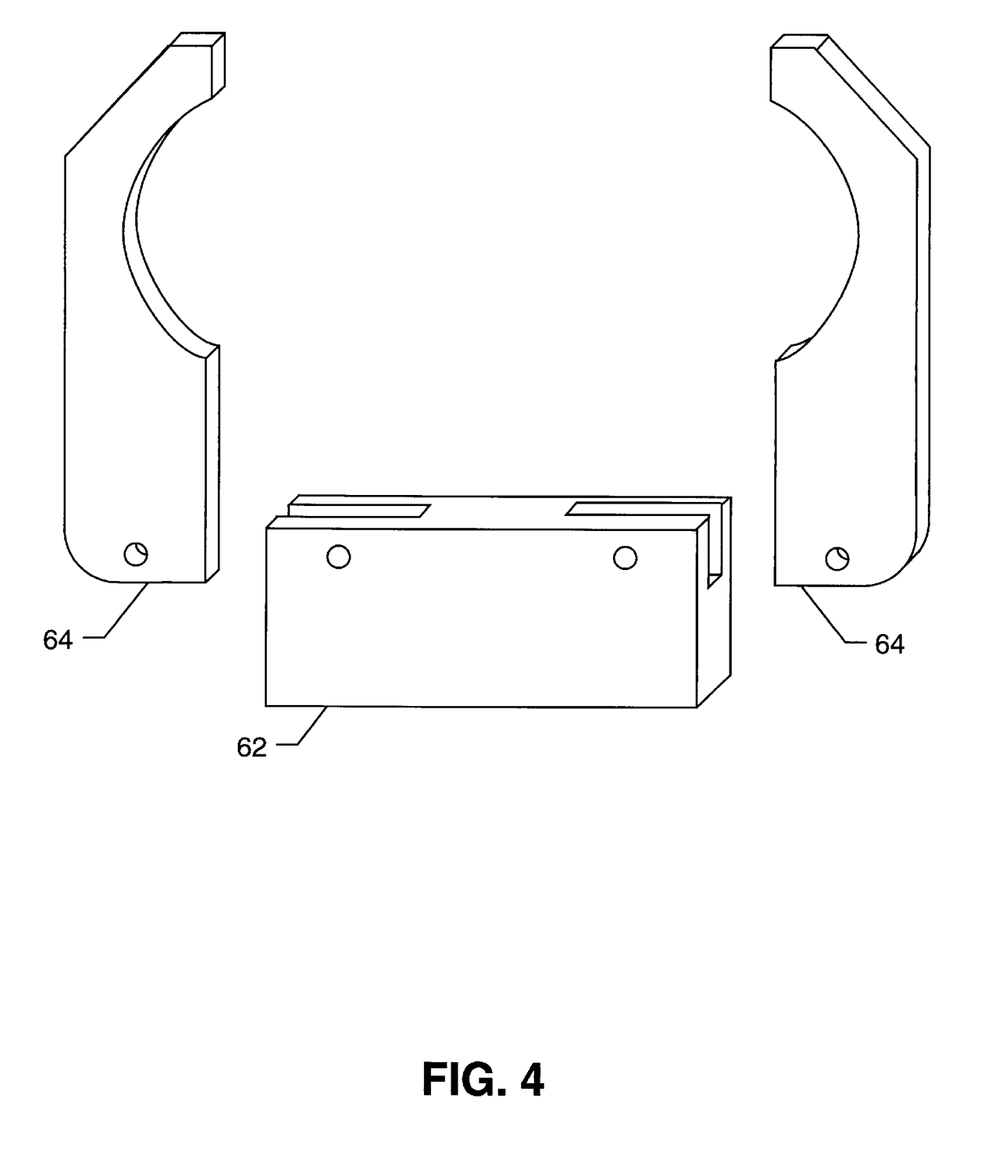
FIG. 4 is a exploded view of an alternate embodiment of the present invention.
Figure 5:
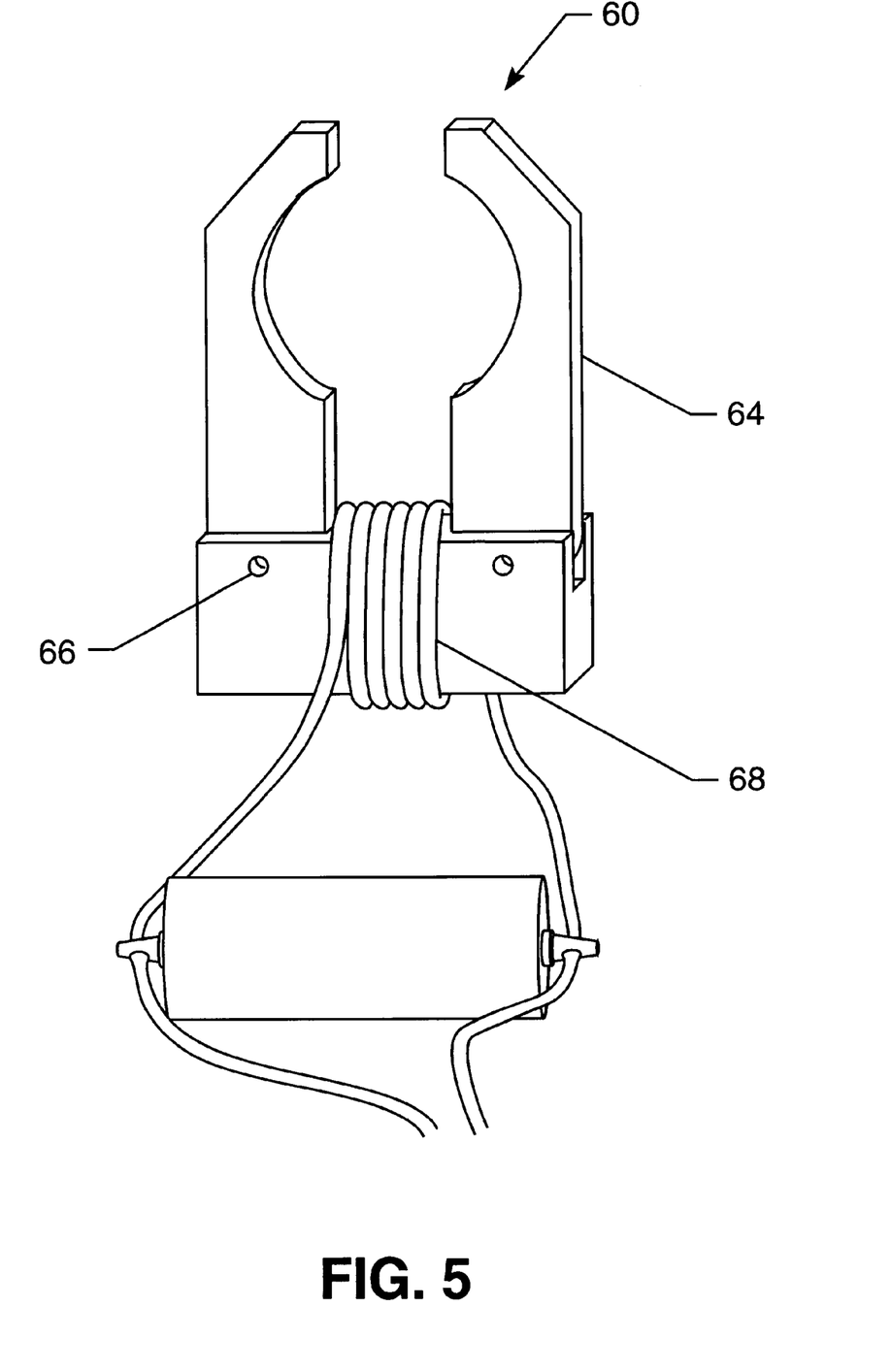
FIG. 5 is a perspective view of an alternate embodiment of the present invention.

Another method of pipe joint heating involves a hinged heating head 60 shown in exploded view in FIG. 4 and as constructed in FIG. 5. The heating head 60 core consists of a 2 inch by 1 inch by 3 inch ferrite base bar 62 and two ½ inch deep by ½ inch wide by 1 inch long slots cut in each end of one side of the base bar 62. A side bar 64 is inserted in each slot so that the side bars 64 are parallel and 1 inch apart. With the side bars 64 in place, a ⅛ inch hole is drilled through the base bar 62 and side bars 64 approximately ½ inch from the ends and ¼ inch down from the slotted side of the base bar 62. Pins 66 inserted in these holes allow the side bars 64 to pivot in the base bar slots. The hinge end of the side bars 64 are rounded to assure necessary clearance between side bars 64 during maximum hinging movement. The side bars 64 are gapped to accommodate for the diameter of the pipe 54 to be heated. An assortment of side bars 64 configured for different diameters of pipe can be substituted by removing the hinge pins 66 and replacing the existing side bars 64 with side bars as required to join specific structures. The coil of a tank circuit 68 is wound around the base bar 62 between the two side bars 64. The heating head 60 is hinged open and positioned around the pipe 54/coupling 52/ring susceptor 50 structure (shown in FIG. 2) so that when closed, it is aligned with the ring susceptor 50. When the tank circuit 68 is energized a magnetic flux generated by the circuit 68 travels through the side bars 64. The magnetic flux is conveyed to the ring susceptor 50. The resulting eddy currents produced in the ring susceptor 50 cause the ring susceptor 50 to rapidly heat to the temperature required to bond the pipe 54 and the coupling 52. The heating head 60 can be hinged open and removed from around the joined pipe 54 and coupling 52.

Figure 3:
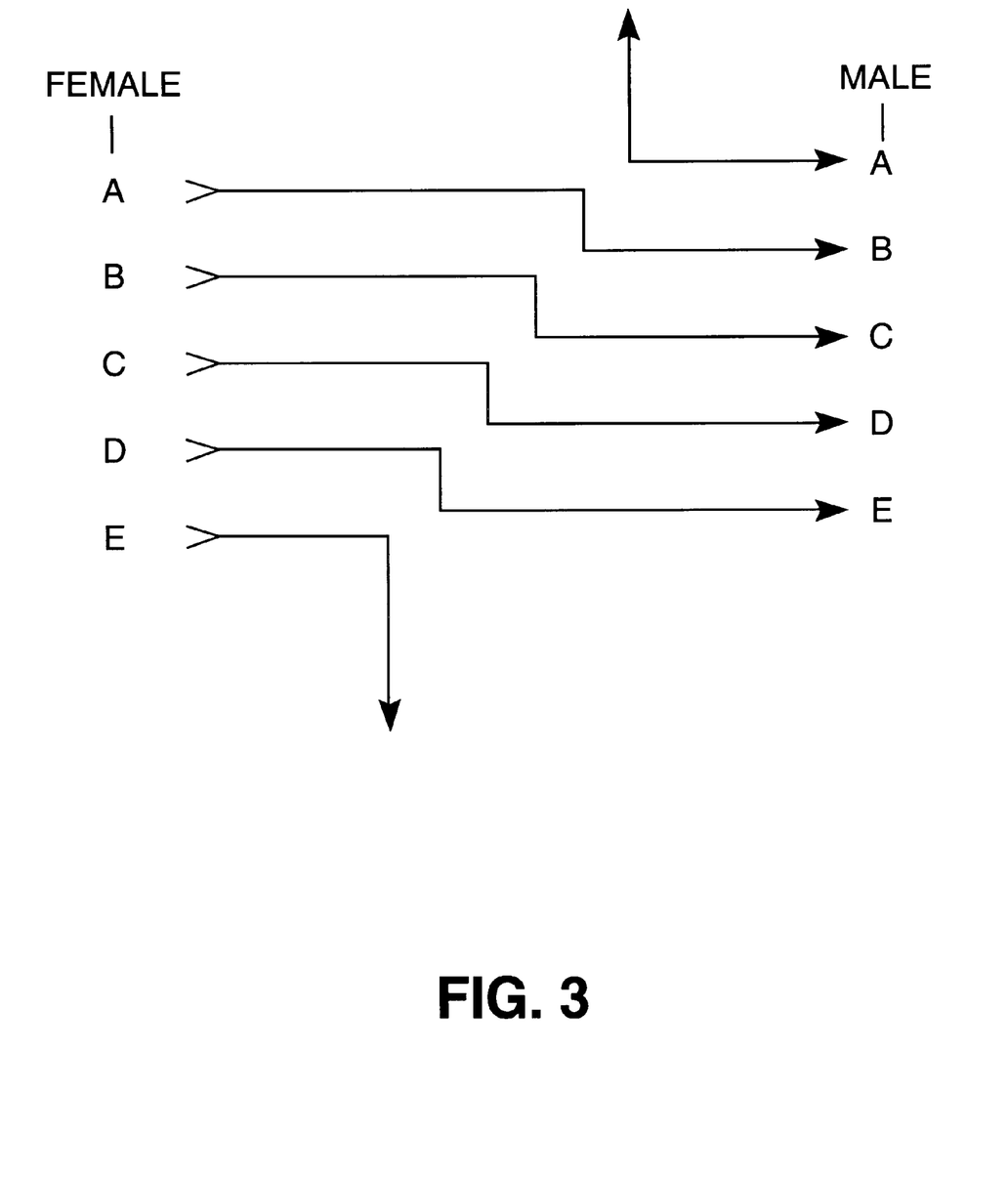
FIG. 3 is a wiring diagram of a tank circuit used in the preferred embodiment.
Figure 6:
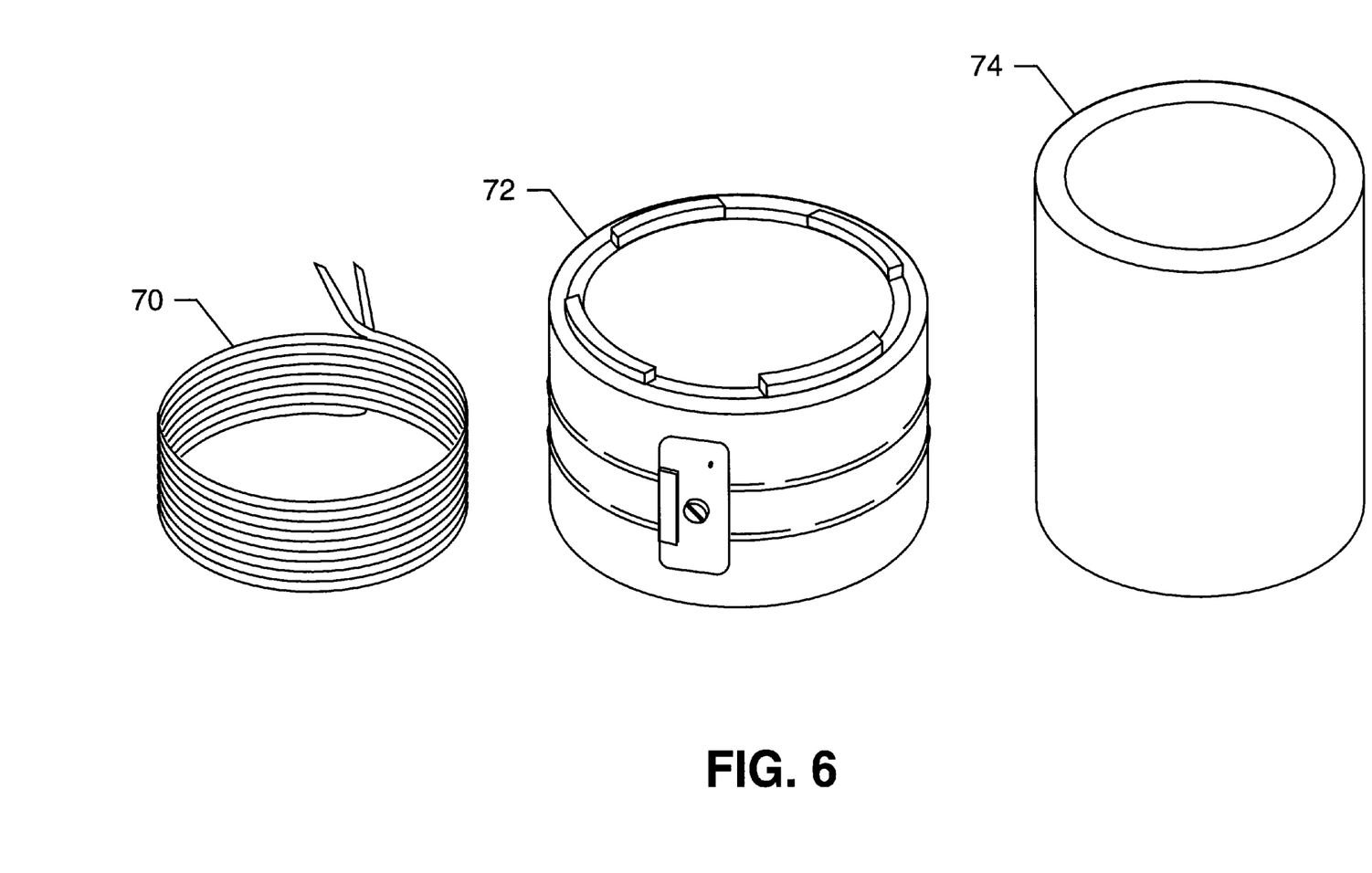
FIG. 6 is perspective view of the component parts of an alternate embodiment of the present invention.
Figure 7:
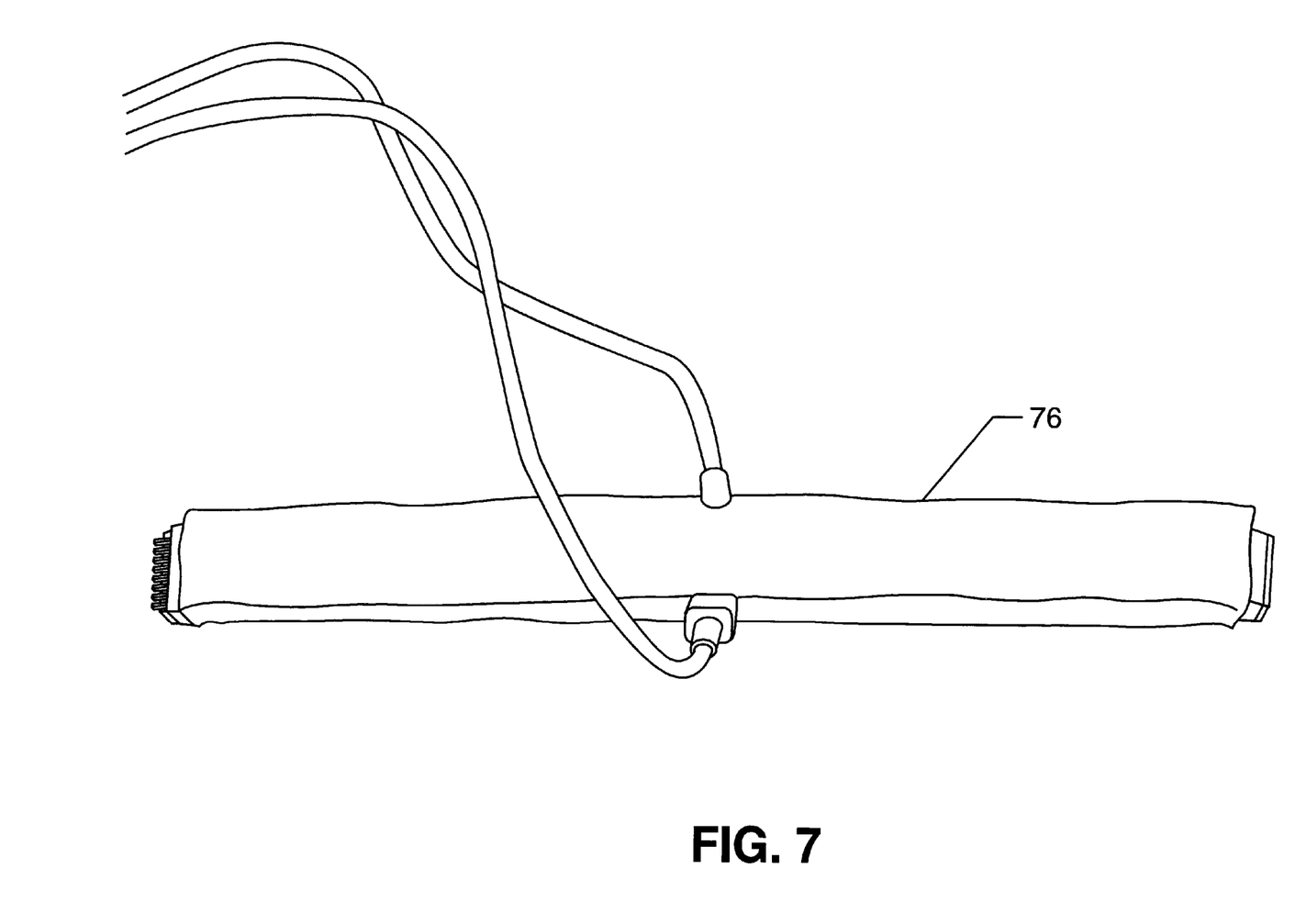
FIG. 7 is a perspective view of a tank circuit used in an alternate embodiment of the present invention.
Figure 8:
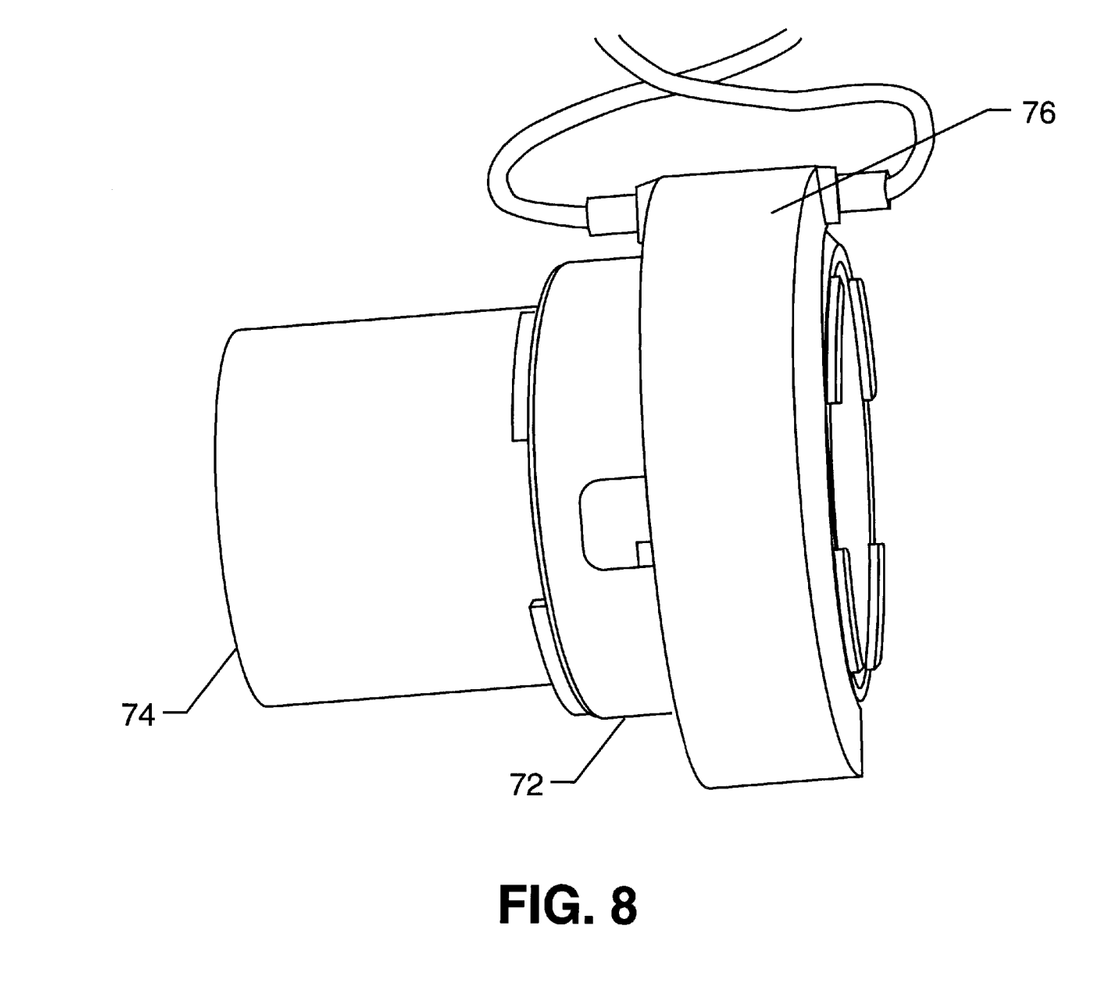
FIG. 8 is a perspective view of an alternate embodiment of the present invention.

An alternate structure for joining pipes is shown in FIGS. 6, 7 and 8. A 2⅜ inch diameter, ½ inch wide coil susceptor 70 is formed using five equally spaced turns of no. 30 gauge wire. The coil susceptor 70 is coated with a material compatible with the type pipe material being joined. The coating fills all spaces between the coil susceptor 70 windings. A coupling 72 is sized so that when the coil susceptor 70 is placed in the coupling 72 and the coupling 72 is positioned on the pipe 74, a tight interface exists between the coil susceptor 70 and the pipe 74. The coil susceptor 70 coating assures that no voids exist in the bond between the coupling 72 and the pipe 74. To accomplish a reliable pressure tight pipe 74 to coupling 72 bond, the coil susceptor 70 must be evenly heated to allow the pipe 74 material to fuse. A reusable induction heating apparatus tank circuit 76 is configured to evenly heat the coil susceptor 70. This apparatus can be quickly installed and removed from around the pipe 74 to coupling 72 bond. With the coupling 72, coil susceptor 70 and pipe 74 properly assembled, heating is accomplished. A five conductor cable is constructed using plastic coated no. 16 gauge strand wire (chosen for its flexibility) and a mating pair of single row five pin "D" subconnectors. The connector bodies are nonmetallic to prevent connector heating during the pipe bonding operation. The circumference of the cable is slightly larger than that of a 2 inch coupling 72. The cable wiring diagram is shown in FIG. 3. With the cable extended and the wires parallel and evenly spaced 3/16 inches apart, to match connector pin spacing, a coating of highly flexible RTV material is applied so that the cable is encases in a ¼ inch thick, ⅞ inch wide belt of rubber. The unconnected ends of the wire from pin "A", male connector, and pin "E", female connector, have been arranged so that they extend out of the rubber. A 0.47 $\mu f$ capacitor completes the tank circuit 76. When the tank circuit 76 is energized by an T-1000 induction power supply commercially available from the Inductron Corporation of Grafton, Va., a magnetic flux field is generated out from the circuit. The coil susceptor 70 located in the pipe to coupling 72 bondline is within the flux field. The nature of induction heating is such that eddy currents are produced in the coil susceptor 70 causing the coil susceptor 70 to rapidly heat to the temperature required to melt the coil susceptor 70 coating and the pipe 74 to coupling 72 interface, resulting in a fused, pressure tight joint.

The embodiments described herein have also been used to braze stainless steel, soft solder copper and brass, and silver solder combinations of these materials (i.e. fittings, couplings and other unrelated parts) and to bind ceramic tubes to plastic/metal/composites and similar ceramic fittings using the described methods of joining.

Many improvements, modifications, and additions will be apparent to the skilled artisan without departing from the spirit and scope of the present invention as described herein and defined in the following claims.

What is claimed is:

1. An apparatus for bonding pipes:
    a first pipe;
    a second pipe to be joined to the first pipe;
    a susceptor coated with an adhesive material placed between the first and second pipes;
    means for inducing a magnetic flux onto the susceptor.
2. The apparatus of claim 1, wherein the second pipe is a coupler.
3. The apparatus of claim 1 wherein the means for inducing a magnetic flux is a tank circuit.
4. The apparatus of claim 1 wherein the susceptor is a perforated metal ring.
5. The apparatus of claim 1 wherein the adhesive material is a plastic, thermoplastic or thermoset.
6. The apparatus of claim 1 wherein the susceptor is a wire coil.
7. The apparatus of claim 6 wherein the wire coil is a coated with a material compatible with the first and second pipes.
8. The apparatus of claim 1 wherein the means for inducing a magnetic flux is an induction heating gun.
9. The apparatus of claim 1 wherein the means for inducing a magnetic flux is an induction heating gun having a hinged heating head.

* * * * *